(12) United States Patent
Liu

(10) Patent No.: US 8,240,695 B1
(45) Date of Patent: Aug. 14, 2012

(54) BABY TRAILER TOWING CONNECTOR

(76) Inventor: Cheh-Kang Liu, Taipei (TW)

( * ) Notice: Subject to any disclaimer, the term of this patent is extended or adjusted under 35 U.S.C. 154(b) by 295 days.

(21) Appl. No.: 12/835,935

(22) Filed: Jul. 14, 2010

(51) Int. Cl.
*B60D 1/48* (2006.01)
(52) U.S. Cl. .......................................... 280/503; 280/204
(58) Field of Classification Search ................. 280/503, 280/504, 492, 493, 204
See application file for complete search history.

(56) References Cited

U.S. PATENT DOCUMENTS

| | | | | |
|---|---|---|---|---|
| 3,993,320 A | * | 11/1976 | Robinson | 280/204 |
| 6,099,008 A | * | 8/2000 | Caffey | 280/204 |
| 6,443,472 B1 | * | 9/2002 | Kahmann | 280/204 |
| 6,663,126 B2 | * | 12/2003 | Britton et al. | 280/204 |
| 6,929,274 B2 | * | 8/2005 | Britton et al. | 280/204 |
| 7,131,657 B1 | * | 11/2006 | Witt | 280/292 |
| 2006/0032681 A1 | * | 2/2006 | Everett et al. | 180/9.4 |

* cited by examiner

*Primary Examiner* — Kevin Hurley
(74) *Attorney, Agent, or Firm* — Jackson IPG PLLC

(57) ABSTRACT

A baby trailer towing connector formed of a first connector, a second connector, a buffer bar and a spring member for the connection of a baby trailer to a baby bicycle is disclosed. The second connector has a connection frame attached to the top wall and opposing sidewalls of the holder block of the first connector and secured thereto by a pin, assuring connection stability and avoiding breaking of the pin during a towing operation.

2 Claims, 7 Drawing Sheets

BABY TRAILER TOWING CONNECTOR

BACKGROUND OF THE INVENTION

1. Field of the Invention

The present invention relates to a connection structure for connection between a baby bicycle and a towing bar of a baby trailer and more particularly, to a baby trailer towing connector, which enhances connection stability and safety, and provides a shock absorbing effect.

2. Description of the Related Art

According to U.S. Pat. No. 6,443,472 B1, a spring is connected between a trailer and a trailer linkage. As shown in FIG. 1, the first end 71 of the trailer linkage 7 is a tubular member having a cylindrical hole 711 for receiving a collar 81 of a towing bracket 8. A pin 9 is inserted through a hole 811 on the collar 81 and a hole 712 on the first end 71 of the trailer linkage 7 to fasten the trailer linkage 7 and the towing bracket 8 together. A bolt (not shown) is inserted through an aperture 82 of the towing bracket 8 and fastened to a rear wheel hub of a baby bicycle to secure the towing bracket 8 to the baby bicycle. This design still has drawbacks as follows:

1. The connection between the tubular first end 71 of the trailer linkage 7 and the collar 81 of a towing bracket 8 is unstable. When the bicycle is towing the baby trailer on the road, the pin 9 will receive a high torque. Therefore, the pin 9 may break easily after a long use.
2. The spring member provides a buffer effect when the bicycle is running over an uneven road surface. However, the shock absorbing effect of the spring member in not sufficient to eliminates all shocks during running of the bicycle over an uneven road surface, and the baby sitting in the baby trailer may feel uncomfortable.

Therefore, it is desirable to provide a baby trailer towing connector, which eliminates the aforesaid problem.

SUMMARY OF THE INVENTION

The present invention has been accomplished under the circumstances in view. It is the main object of the present invention to provide a baby trailer towing connector, which is formed of a first connector, a second connector, a buffer bar and a spring member for the connection of a baby trailer to a baby bicycle. The second connector has a connection frame arranged to the top wall and opposing sidewalls of the holder block of the first connector and secured thereto by a pin, assuring connection stability and avoiding breaking of the pin during a towing operation.

It is another object of the present invention to provide a baby trailer towing connector, which has the buffer bar and the spring member connected between the second connector and the towing bar of the baby trailer, so that the buffer bar and the spring member provide a buffer effect to absorb shocks when the baby bicycle is towing the baby trailer over an uneven road surface or turning to another direction, assuring sitting comfort of the baby in the baby trailer.

It is still another object of the present invention to provide a baby trailer towing connector, which has the holder box of the first connector be fitted into the connection frame of the second connector and fastened thereto with the pin conveniently after connection of the mounting through hole of the first connector to the baby bicycle's rear wheel hub, facilitating installation and saving much the installation time.

DETAILED DESCRIPTION OF THE INVENTION

Figure 1:
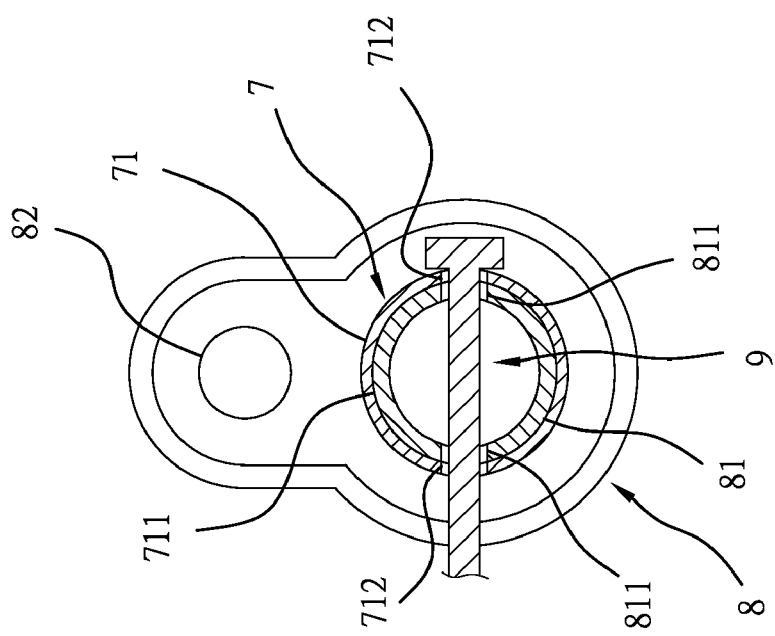
FIG. 1 is a schematic sectional view showing connection between a towing bar and a towing bracket according to the prior art.
Figure 2:
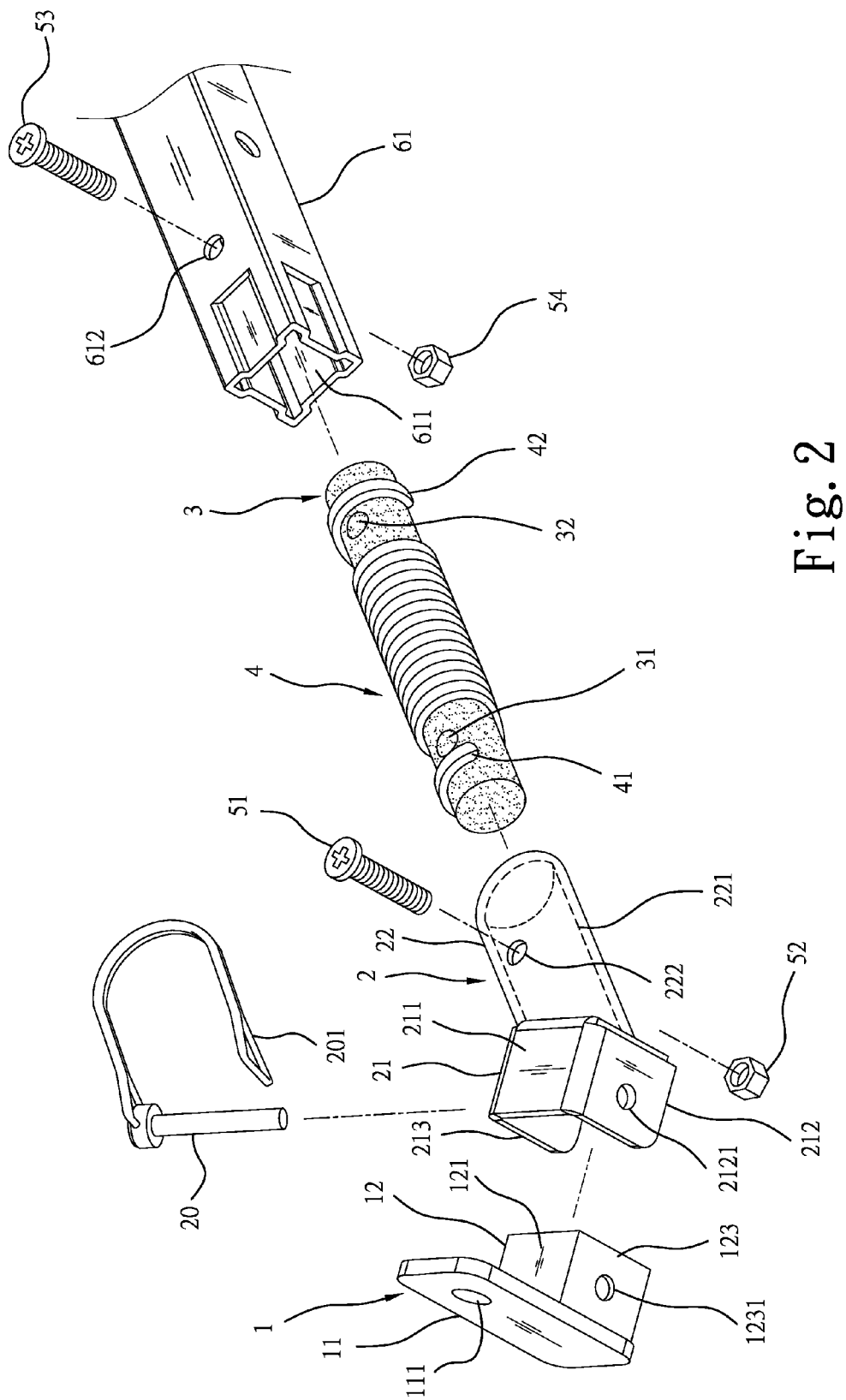
FIG. 2 is an exploded view of a baby trailer towing connector in accordance with the present invention.
Figure 3:
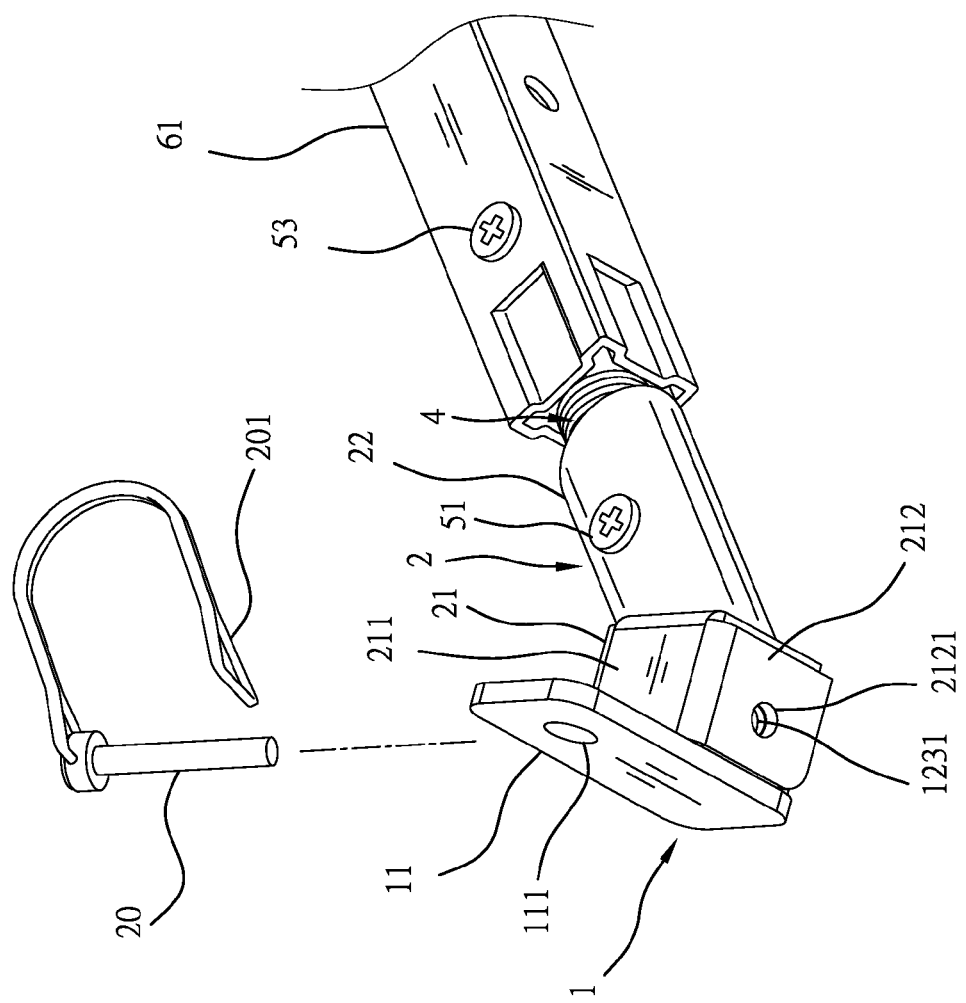
FIG. 3 is an assembly view of the baby trailer towing connector in accordance with the present invention before installation of the pin.
Figure 4:
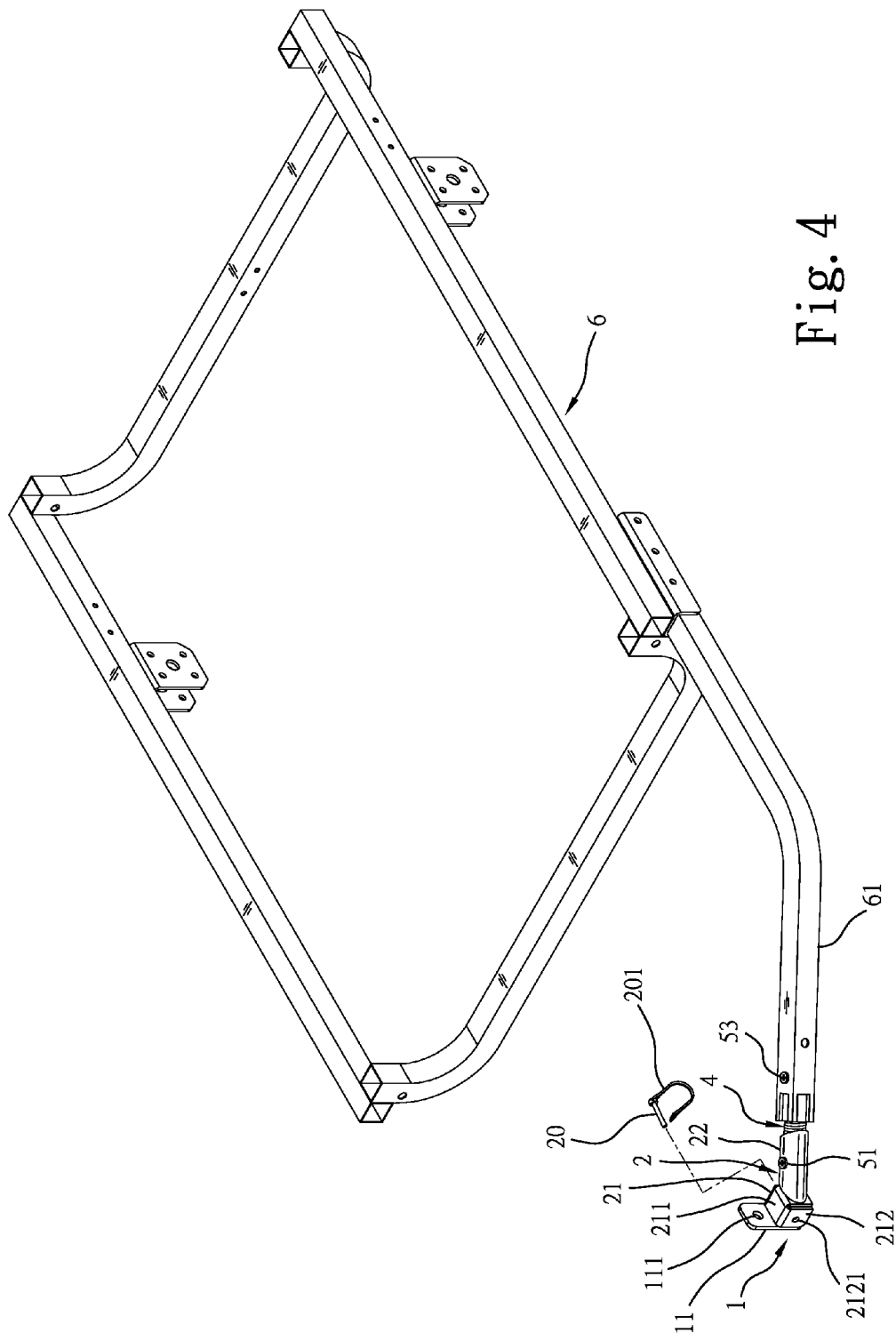
FIG. 4 is an installed view of the present invention, showing the baby trailer towing connector fastened to the towing bar of the base frame of a baby trailer.
Figure 5:
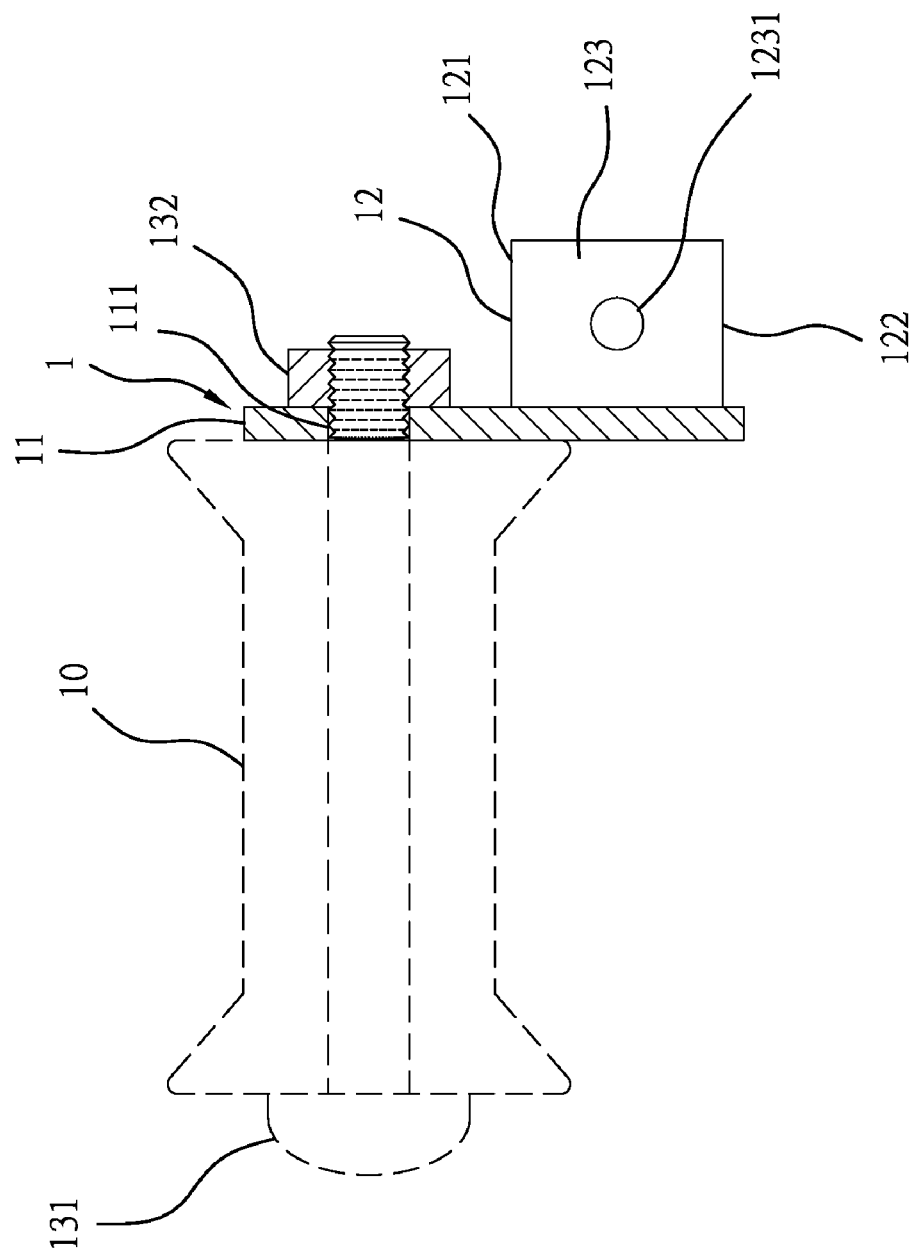
FIG. 5 is a schematic drawing of the present invention, showing the first connector of the baby trailer towing connector fastened to the rear wheel hub of a baby bicycle.
Figure 6:
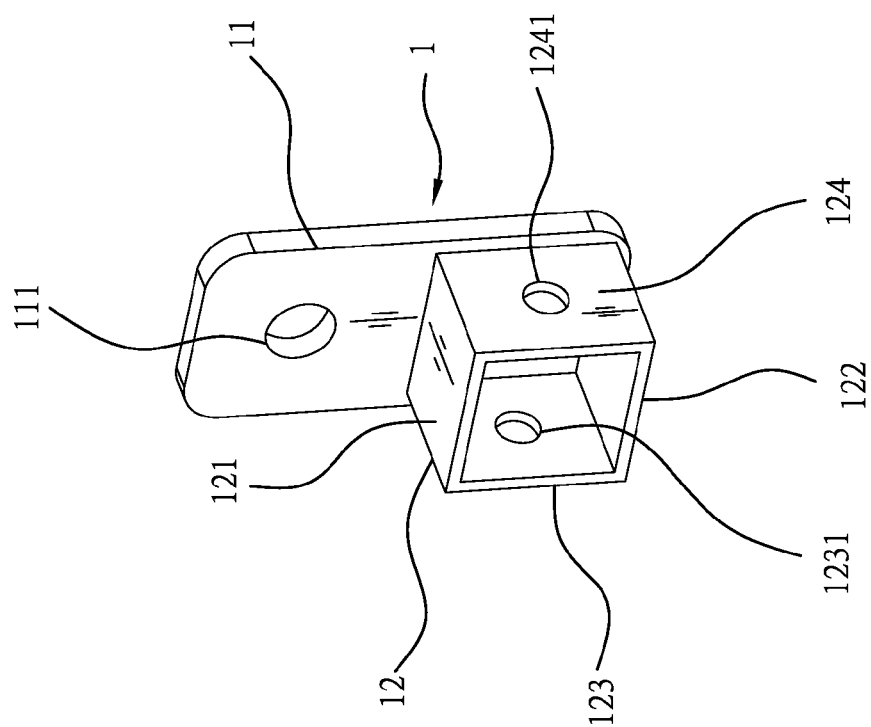
FIG. 6 is an oblique bottom elevation of the first connector for baby trailer towing connector in accordance with the present invention.
Figure 7:
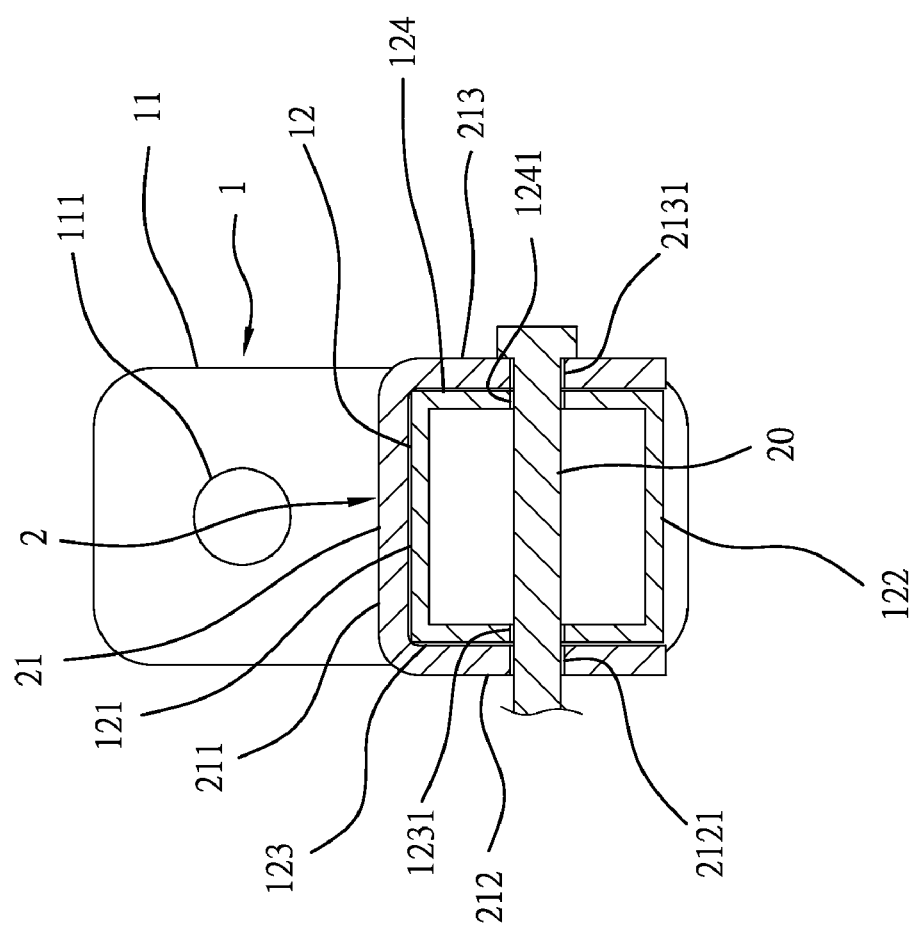
FIG. 7 is a schematic sectional view of the present invention, showing the first connector and the second connector fastened together.

Referring to FIGS. 2-7, a baby trailer towing connector in accordance with the present invention is shown, comprising: a first connector 1, which comprises a mounting panel 11 that has a mounting through hole 111 for fastening to a baby bicycle's rear wheel hub 10 with a quick release or any other fastening means, for example, a screw 131 and a nut 132 (see FIG. 5), and a holder box 12 that is located on one side of the mounting panel 11, having a top wall 121, a bottom wall 122, a left sidewall 123 and a right sidewall 124 connected between the top wall 121 and the bottom wall 122 at two opposite sides and a pin hole 1231 or 1241 located on each of the left and right sidewalls 123;124;

a second connector 2, which comprises a connection frame 21 that has a top wall 211 for supporting on the top wall 121 of the holder box 12, a left sidewall 212 and a right sidewall 213 respectively perpendicularly extended from the top wall 211 at two sides in a parallel manner for supporting on the left and right sidewalls 123;124 of the holder box 12 (see FIG. 2 and FIG. 7), a pin hole 2121 or 2131 cut through each of the left and right sidewalls 212;213 and a pin 20 for insertion through the pin holes 2121;2131 of the second connector 2 and the pin holes 1231;1241 of the holder box 12, and a connection rod 22 that extends from one side of the connection frame 21 and has an axial hole 221 and a transverse mounting hole 222 cut through the periphery thereof in communication with the axial hole 221;

a buffer bar 3 prepared from a flexible material such as polyurethane, rubber or silicon rubber and inserted with its two distal ends thereof into the axial hole 221 of the connection rod 22 of the second connector 2 and an axial hole 611 of a towing bar 61 of a baby trailer's base frame 6, having a first transverse through hole 31 located on its one end, which is kept in alignment with the transverse mounting hole 222 of the connection rod 22 so that a screw 51 can be inserted through the first transverse through hole 31 and the transverse mounting hole 222 and fastened up with a nut 52 to secure the buffer bar 3 and the second connector 2 together, and a second transverse through hole 32 located on its other end, which is kept in alignment with a transverse mounting hole 612 of the towing bar 61 so that a screw 53 can be inserted through the second transverse through hole 32 and the transverse mounting hole 612 and fastened up with a nut 54 to secure the buffer bar 3 and the towing bar 61 together; and a spring member 4 sleeved onto the buffer bar 3, having two distal ends 41;42 thereof respectively fastened to the two distal ends of the buffer bar 3.

When in use, the second connector 2 and the buffer bar 3 are connected to the towing bar 61, and the mounting panel 11 of the first connector 1 is connected to the baby bicycle's rear wheel hub 10. After insertion of the pin 20 through the pin holes 2121;2131 of the a connection frame 21 that has a top wall 211 for supporting on the top wall 121 of the left and right sidewalls 212;213 of the connection frame 21 of the second connector 2 and the pin holes 1231;1241 of the left and right sidewalls 123;124 of the holder box 12 of the first connector 1 and fastening of the retaining member 201 that has one end fastened to one end of the pin 20 and the other end releasably fastened to the other end of the pin 20, the towing bar 61 is linked to the baby bicycle's rear wheel hub 10. Thus, the baby bicycle is running on a road surface, it carries the baby trailer by means of the towing bar 61. Further, when the baby bicycle is towing the baby trailer over an uneven road surface or turning to another direction, the buffer bar 3 and the spring member 4 provide a buffer effect to absorb shocks.

In general, the invention has the following benefits:
1. The connection frame 21 of the second connector 2 is attached to the holder box 12 of the first connector 1 to let the top wall 211, left sidewall 212 and right sidewall 213 of the connection frame 21 be respectively supported on the left and right sidewalls 123;124 of the holder box 12 so that the first connector 1 and the second connector 2 can be positively secured together, avoiding breaking of the pin 20 and enhancing the safety during operation.
2. The buffer bar 3 is inserted through the spring member 4 and connected between the second connector 2 and the towing bar 61, the buffer bar 3 and the spring member 4 provide a buffer effect to absorb shocks when the baby bicycle is towing the baby trailer over an uneven road surface or turning to another direction, assuring sitting comfort of the baby in the baby trailer.
3. After connection of the mounting through hole 111 of the first connector 1 to the baby bicycle's rear wheel hub 10, the holder box 12 of the first connector 1 can be fitted into the connection frame 21 of the second connector 2 and fastened thereto with the pin 20 conveniently. Thus, the installation of the present invention is simple and time-saving.

While only one embodiment of the present invention has been shown and described, it will be understood that various modifications and changes could be made thereunto without departing from the spirit and scope of the invention disclosed.

What is claimed is:

1. A baby trailer towing connector, comprising:
a first connector, said first connector comprising a mounting panel and a holder box located on one side of said mounting panel, said mounting panel having a mounting through hole for fastening to a baby bicycle's rear wheel hub with a fastener, said holder box having a top wall, a bottom wall, a left sidewall and a right sidewall connected between the top wall and the bottom wall at two opposite sides and a pin hole located on each of the left sidewall and the right sidewall;
a second connector, said second connector comprising a connection frame, said connection frame having a top wall attached to the top wall of said holder box, a left sidewall and a right sidewall respectively perpendicularly extended from the top wall thereof at two sides in a parallel manner and respectively attached to the left sidewall and right sidewall of said holder box, a pin hole cut through each of the left sidewall and right sidewall thereof, a pin inserted through the pin holes of said second connector and the pin holes of said holder box to fasten said first connector and said second connector together, and a connection rod extended from one side of said connection frame, said connection rod comprising an axial hole and a transverse mounting hole cut through the periphery thereof in communication with said axial hole;
a buffer bar, said buffer bar having a first end inserted into the axial hole of said connection rod of said second connector, a second end inserted into an axial hole of a towing bar of a baby trailer's base frame, a first transverse through hole located on said first end and connected to the transverse mounting hole of said connection rod by a first fastener, and a second transverse through hole located on said second end and connected to a transverse mounting hole of said towing bar of said baby trailer's base frame with a second fastener; and
a spring member sleeved onto said buffer bar, said spring member having two distal ends thereof respectively fastened to the two distal ends of said buffer bar.

2. The baby trailer towing connector as claimed in claim 1, wherein said buffer bar is prepared from a flexible material selected from a group consisting of polyurethane, rubber and silicon rubber.

\* \* \* \* \*